United States Patent
Warnicke et al.

(10) Patent No.: US 11,228,651 B2
(45) Date of Patent: Jan. 18, 2022

(54) PATH VALIDATION AND PERFORMANCE ASSURANCE FOR DISTRIBUTED NETWORK ENDPOINTS

(71) Applicant: Cisco Technology, Inc., San Jose, CA (US)

(72) Inventors: Edward A. Warnicke, Austin, TX (US); Nagendra Kumar Nainar, Morrisville, NC (US); Carlos M. Pignataro, Cary, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 16/559,526

(22) Filed: Sep. 3, 2019

(65) Prior Publication Data

US 2021/0067592 A1    Mar. 4, 2021

(51) Int. Cl.
*H04L 29/08*    (2006.01)
*H04L 12/26*    (2006.01)

(52) U.S. Cl.
CPC ............ *H04L 67/141* (2013.01); *H04L 43/10* (2013.01); *H04L 67/10* (2013.01); *H04L 67/16* (2013.01)

(58) Field of Classification Search
CPC ....... H04L 67/10; H04L 67/16; H04L 67/141; H04L 43/10
USPC ...................................................... 709/227
See application file for complete search history.

(56) References Cited

U.S. PATENT DOCUMENTS

| | | |
|---|---|---|
| 8,688,839 B2 | 4/2014 | Subramanian et al. |
| 8,693,374 B1 | 4/2014 | Murphy et al. |
| 8,711,855 B1 | 4/2014 | Murphy et al. |
| 9,026,595 B2 | 5/2015 | Subramanian et al. |
| 9,100,285 B1 | 8/2015 | Choudhury et al. |
| 9,450,817 B1 | 9/2016 | Bahadur et al. |

(Continued)

FOREIGN PATENT DOCUMENTS

| | | |
|---|---|---|
| CN | 103873366 A | 6/2014 |
| CN | 103873378 A | 6/2014 |

(Continued)

OTHER PUBLICATIONS

Moradi et al. "Monitoring Transport and Cloud for Network Functions Virtualization," 2015 Fourth European Workshop on Software Defined Networks, Sep. 30-Oct. 2, 2015 (Abstract Only).

(Continued)

*Primary Examiner* — James E Springer
(74) *Attorney, Agent, or Firm* — Patterson + Sheridan, LLP

(57) ABSTRACT

Techniques for network validation are provided. A first request is received at a first manager component, from a first client. The first client and the first manager component are on a first node of a plurality of nodes, and the first request specifies a desired network service. A first network service endpoint that is capable of providing the desired network service is identified, where the first network service endpoint is on a second node of the plurality of nodes. A connection is established between a first validation agent on the first node and a second validation agent on the second node. Finally, upon determining that the connection between the first and second validation agents satisfies predefined criteria, a connection is established between the first client and the first network service endpoint.

20 Claims, 10 Drawing Sheets

(56) References Cited

U.S. PATENT DOCUMENTS

| | | |
|---|---|---|
| 9,537,716 B1* | 1/2017 | Earl .................. H04L 67/141 |
| 9,819,540 B1 | 11/2017 | Bahadur et al. |
| 10,097,372 B2 | 10/2018 | Bhattacharya et al. |
| 2004/0243703 A1* | 12/2004 | Demmer ................ H04L 29/06 709/224 |
| 2006/0265506 A1* | 11/2006 | Merkh .................. H04L 67/14 709/227 |
| 2014/0206348 A1* | 7/2014 | Johnsson .............. H04W 8/005 455/434 |
| 2014/0211615 A1 | 7/2014 | Murphy et al. |
| 2015/0207677 A1 | 7/2015 | Choudhury et al. |
| 2015/0207724 A1 | 7/2015 | Choudhury et al. |
| 2015/0304209 A1 | 10/2015 | Choudhury et al. |
| 2016/0197808 A1* | 7/2016 | Popokh .............. H04L 41/5038 370/248 |
| 2017/0374174 A1 | 12/2017 | Evens et al. |
| 2018/0034858 A1* | 2/2018 | Gummaraju ........ H04L 63/1433 |

FOREIGN PATENT DOCUMENTS

| | | |
|---|---|---|
| EP | 2747354 A1 | 6/2014 |
| EP | 2747355 A1 | 6/2014 |
| EP | 2953301 A1 | 12/2015 |

OTHER PUBLICATIONS

Sysdig, "Cloud-Native Visibikity+Security," [Accessed Online Jul. 15, 2019] https://sysdig.com/.

Google/Cadvisor, [Accessed Online Jul. 15, 2019] https://github.com/google/cadvisor.

Prometheus—Monitoring system & time series database, [Accessed Online Jul. 15, 2019] https://prometheus.io/.

Network Service Mesh, The Hybrid/Multi-cloud IP Service Mesh [Accessed Online Aug. 29, 2019] http://networkservicemesh.io.

* cited by examiner

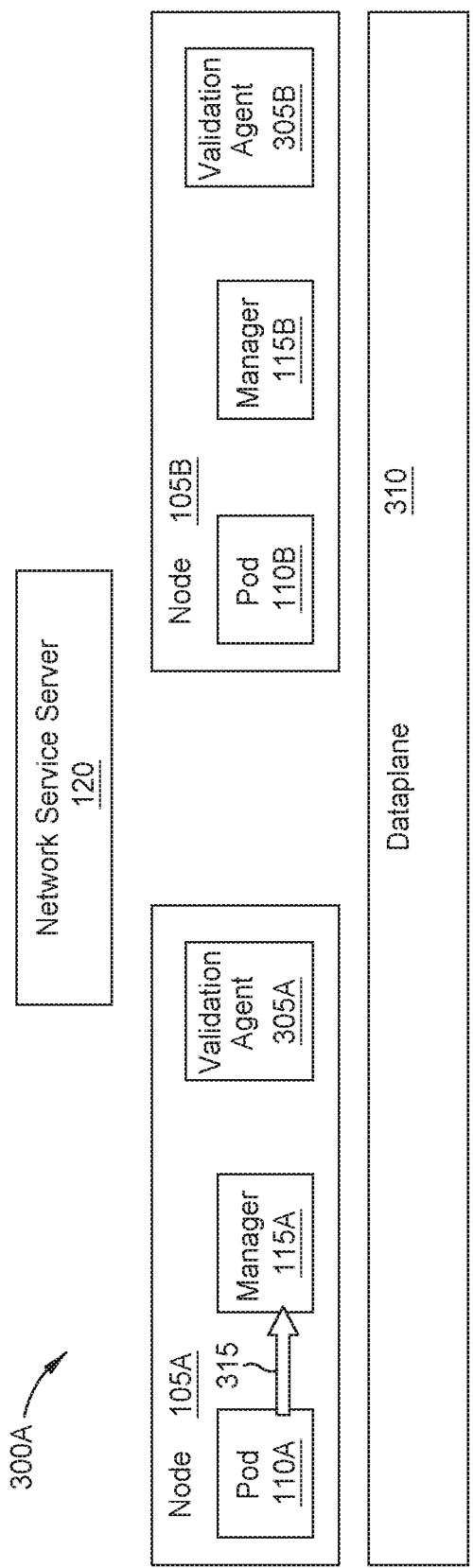
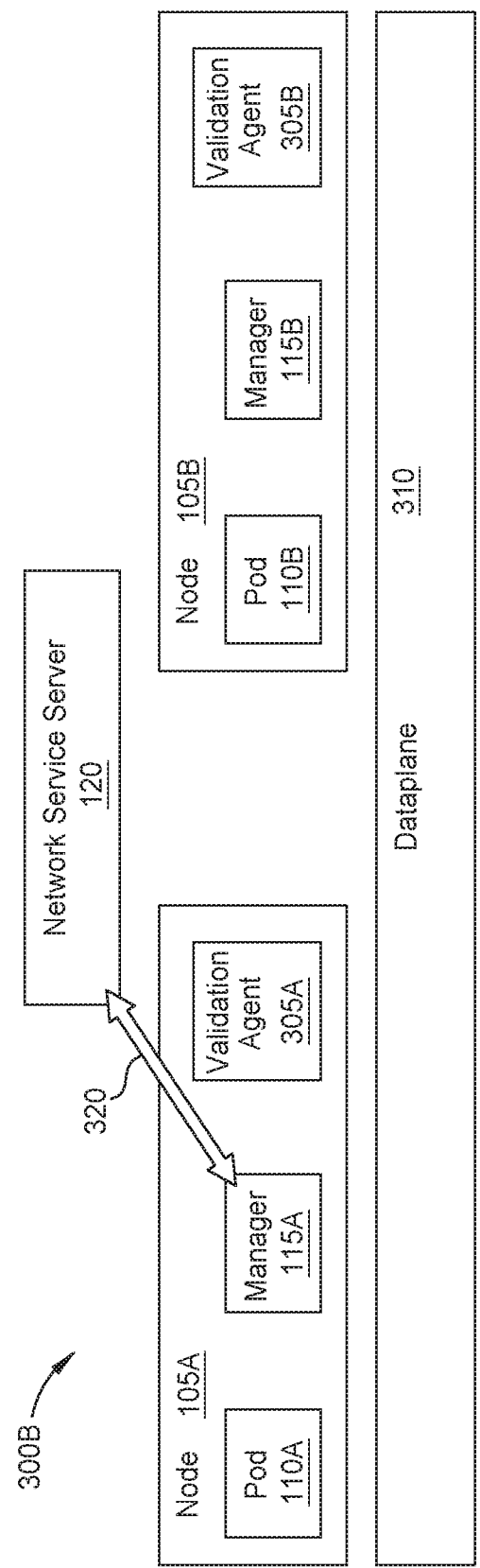
FIG. 3A
FIG. 3B

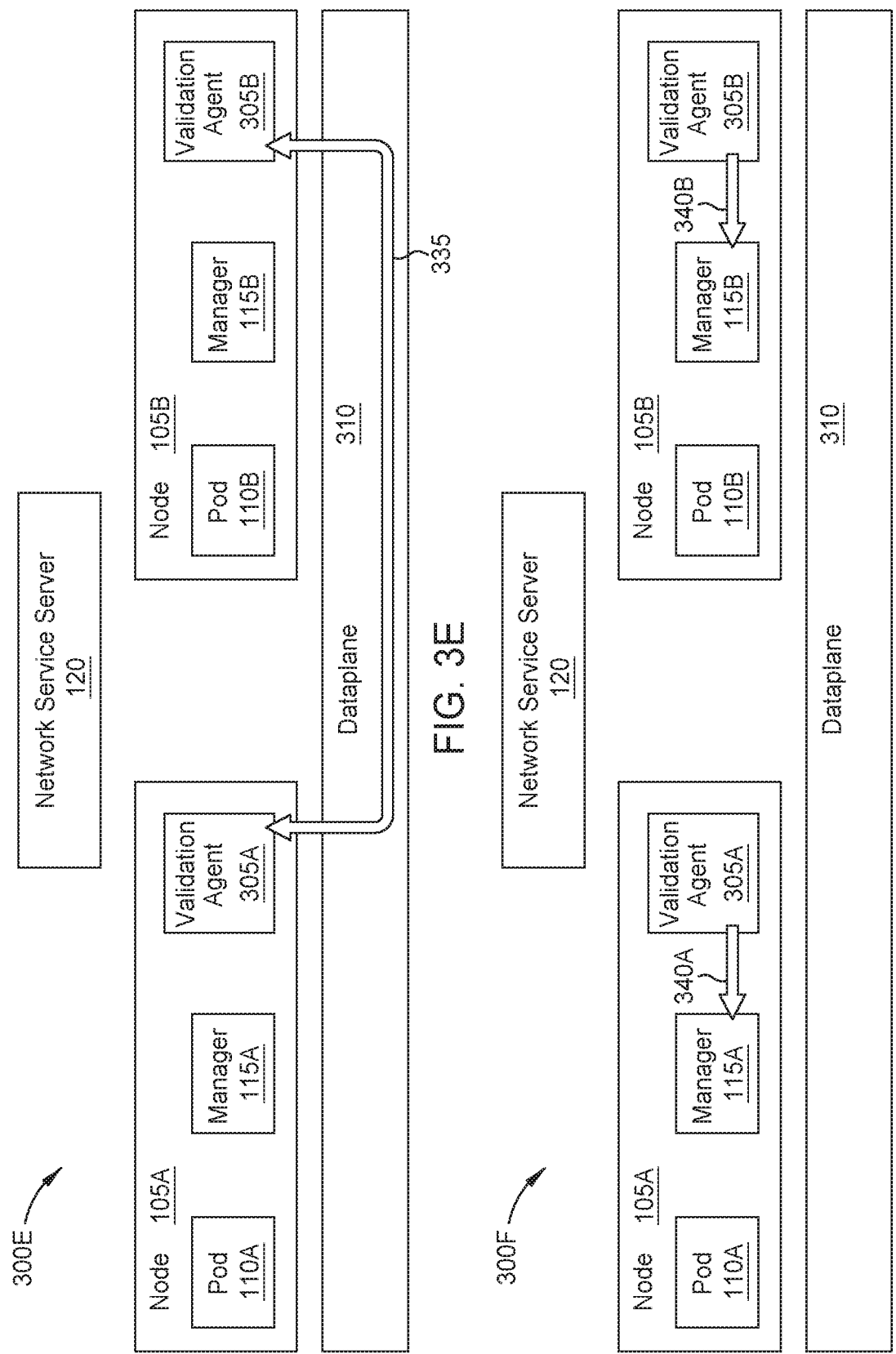

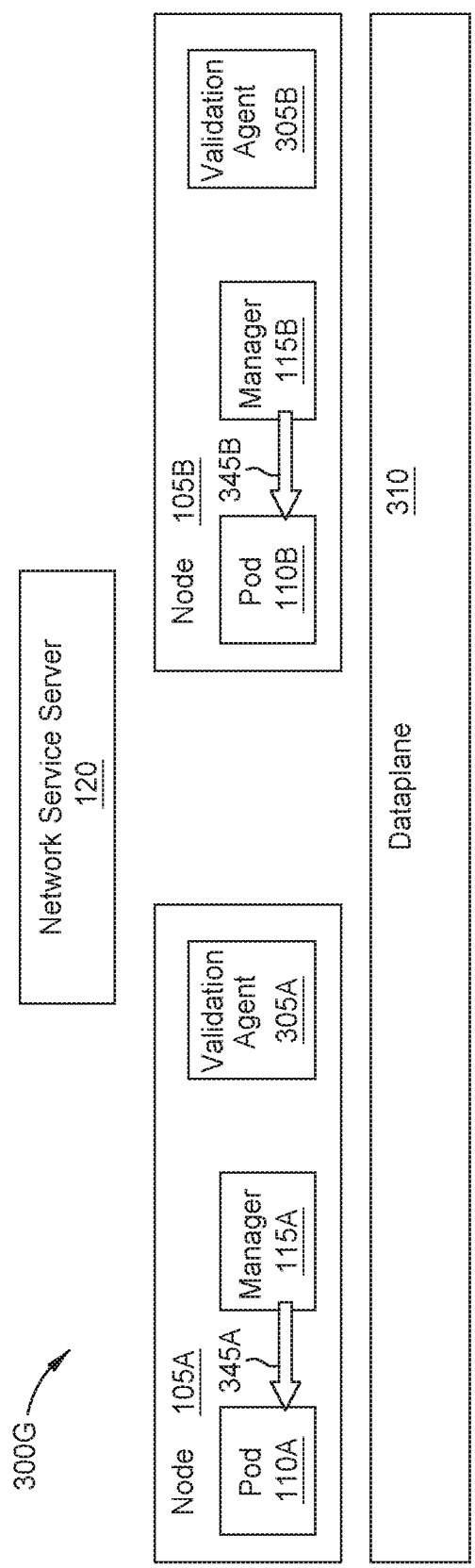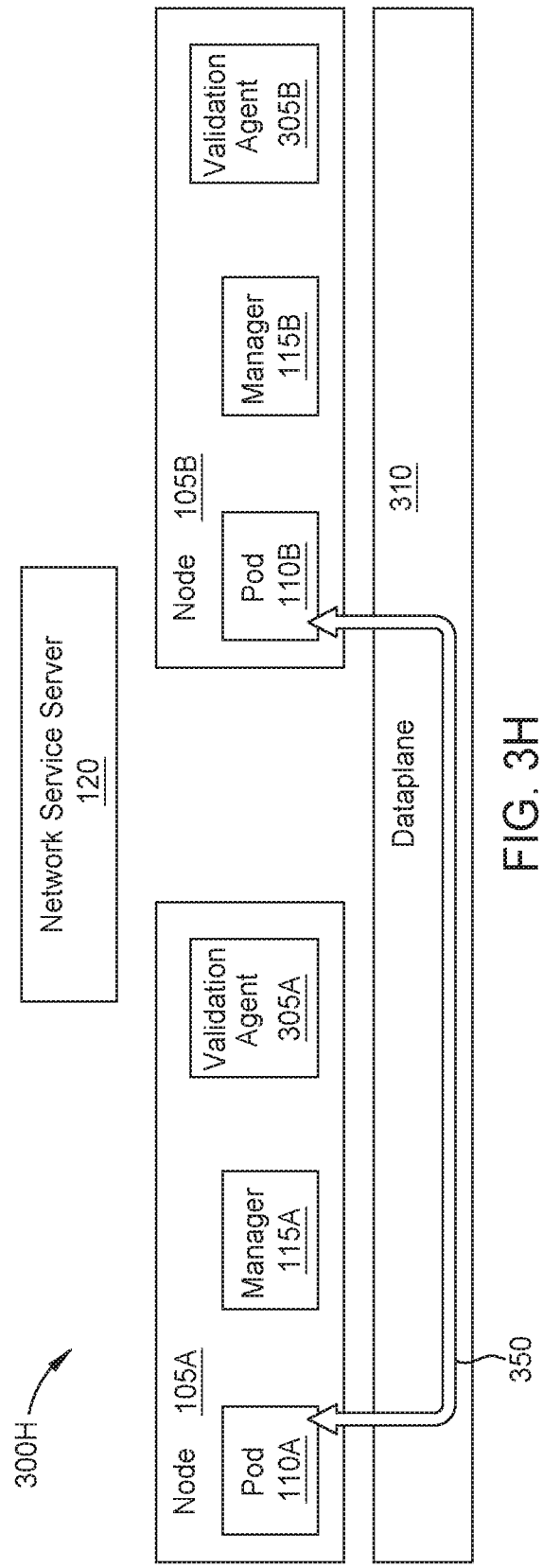

PATH VALIDATION AND PERFORMANCE ASSURANCE FOR DISTRIBUTED NETWORK ENDPOINTS

TECHNICAL FIELD

Embodiments presented in this disclosure generally relate to network performance. More specifically, embodiments disclosed herein relate to path validation between network nodes.

BACKGROUND

In many modern networks, service endpoints can be used to provide network services to client applications. In some such networks, the endpoints may be distributed across any number of hosts or nodes. For example, an application residing in a particular host may access service resources available locally on the host, or may utilize services available on a different host or node. In typical deployments, there can be a number of endpoints able to provide the requested service. Additionally, there are often several paths through the network from the requesting application to the selected service endpoint. It is often difficult or impossible to analyze these paths, which makes it similarly difficult to select the optimal path to utilize. Additionally, owing to the frequent fluctuations and performance shifts in typical network load and capacity, a given link may degrade or fail to provide sufficient connectivity at any time, without warning.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 3A through 3H illustrate a workflow for validating and creating connections between network endpoints, according to one embodiment disclosed herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
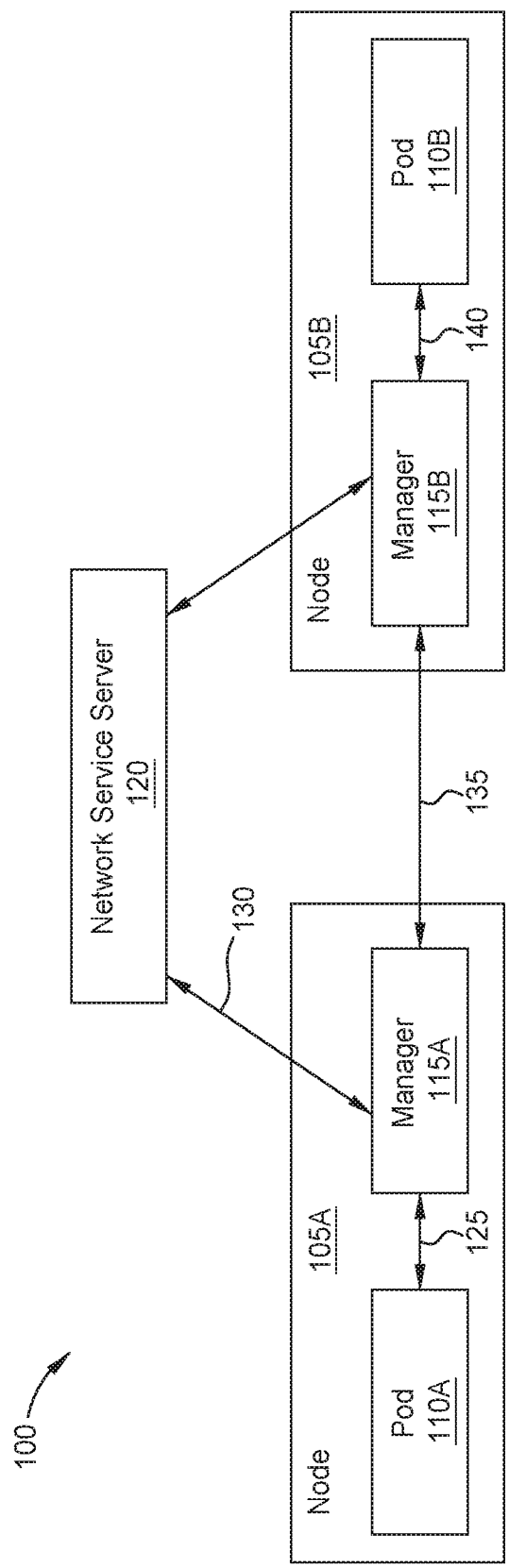
FIG. 1 illustrates an environment configured to perform path validation and assurance between applications in a network mesh, according to one embodiment disclosed herein.

According to one embodiment presented in this disclosure, a method is provided. The method includes receiving, at a first manager component, a first request from a first client, wherein the first client and the first manager component are on a first node of a plurality of nodes, and wherein the first request specifies a desired network service. The method further includes identifying a first network service endpoint that is capable of providing the desired network service, wherein the first network service endpoint is on a second node of the plurality of nodes. Additionally, the method includes establishing a connection between a first validation agent on the first node and a second validation agent on the second node. Finally, upon determining that the connection between the first and second validation agents satisfies predefined criteria, the method includes establishing a connection between the first client and the first network service endpoint.

According to a second embodiment presented in this disclosure, a non-transitory computer-readable storage medium is provided. The computer-readable storage medium includes computer-readable program code embodied therewith, which is executable by one or more computer processors to perform an operation. The operation includes receiving, at a first manager component, a first request from a first client, wherein the first client and the first manager component are on a first node of a plurality of nodes, and wherein the first request specifies a desired network service. The operation further includes identifying a first network service endpoint that is capable of providing the desired network service, wherein the first network service endpoint is on a second node of the plurality of nodes. Additionally, the operation includes establishing a connection between a first validation agent on the first node and a second validation agent on the second node. Finally, upon determining that the connection between the first and second validation agents satisfies predefined criteria, the operation includes establishing a connection between the first client and the first network service endpoint.

According to a third embodiment presented in this disclosure, a system is provided. The system includes one or more computer processors, and a memory containing a program which when executed by the one or more computer processors, performs an operation. The operation includes receiving, at a first manager component, a first request from a first client, wherein the first client and the first manager component are on a first node of a plurality of nodes, and wherein the first request specifies a desired network service. The operation further includes identifying a first network service endpoint that is capable of providing the desired network service, wherein the first network service endpoint is on a second node of the plurality of nodes. Additionally, the operation includes establishing a connection between a first validation agent on the first node and a second validation agent on the second node. Finally, upon determining that the connection between the first and second validation agents satisfies predefined criteria, the operation includes establishing a connection between the first client and the first network service endpoint.

Example Embodiments

Embodiments of the present disclosure provide techniques and systems that enable path validation between network endpoints in order to provide performance assurance, service level agreement (SLA) compliance, and the like. In some embodiments, when a service is requested, embodiments of the present disclosure can identify and validate the available service endpoints (and the network paths or links to each), in order to select an optimal connection. In one embodiment, this connectivity can be continuously monitored to ensure that the performance requirements remain satisfied. Some embodiments of the present disclosure are implemented within a Network Service Mesh (NSM) architecture. In an embodiment, the service mesh architecture includes applications and services distributed across any number of nodes or hosts (e.g., physical or virtual machines). Within each such node, a number of pods or containers can be instantiated to host the applications and services. As used herein, components are considered to be "local" to each other if they are located within a node, and "remote" from each other if they reside on different nodes.

In some embodiments, each node further includes a management component that is responsible for provisioning resources for the hosted applications. For example, in an embodiment, a client application can transmit a request to the management component, requesting a particular service. In embodiments, the management component can identify a network service endpoint capable of providing the service (either locally on the same node, or on a separate node). In embodiments of the present disclosure, the management component can further identify the potential network pathways to the endpoint(s), validate each path, and select the path best-suited for the client application. In one embodiment, this includes creating and/or connecting to validation agents on each node, and analyzing the connectivity between these agents.

In some embodiments, the system can further inject a validation application into the pod that hosts the client application and/or the network service. Probe packets can then be periodically transmitted between these injected probes (using the same link that connects the client and the service endpoint) in order to monitor the ongoing connectivity. In some embodiments of the present disclosure, client applications can specifically request that the connectivity be validated and/or monitored. This initial service request can include these requirements (e.g., specifying the allowable latency, jitter, delay, loss, and the like). In some embodiments, these requirements can be specified in a client profile. In such an embodiment, the management component can refer to the client profile to determine the minimum requirements for the connection.

FIG. 1 illustrates an environment 100 configured to perform path validation and assurance between applications in a network mesh, according to one embodiment disclosed herein. In the illustrated embodiment, the network mesh includes two Nodes 105A and 105B. Each Node 105 includes a corresponding Manager 115A and 115B, as well as one or more Pods 110A and 110B (also referred to as network service endpoints). In an embodiment, Pods 110 are logical partitions or units that host one or more applications, services, and the like. In the illustrated embodiment, each Pod 110 is communicatively with the corresponding Manager 115 for the Node 105. For example, the application(s) residing in the Pod 110A can communicate with the Manager 115A, and the Pod 110B interacts with the Manager 115B. In an embodiment, when an application (e.g., residing in Pod 110A) requires a network service, a request is generated and transmitted to the corresponding Manager 115. In some embodiments, the application generates this request. In another embodiment, the Pod 110 generates and transmits the request on behalf of the application.

In some embodiments, the Manager 115 can determine whether the network service is available locally (e.g., on the same Node 105). If so, this local endpoint can be selected for use. In one embodiment, the Manager 115 can similarly identify or discover other locations in the network mesh where the service is available. In the illustrated embodiment, the mesh includes a Network Service Server 120. In one embodiment, to identify network endpoints, the Manager 115 transmits a request specifying the desired service to the Network Service Server 120, and receives a response indicating the path(s) and/or endpoint(s). Referring to FIG. 1, suppose the Manager 115A transmits a request to the Network Service Server 120, and receives a response indicating that an application residing in Pod 110B (or another service endpoint residing in Node 105B) is capable of servicing the request.

In one embodiment, the Manager 115A can identify the corresponding Manager 115B, and generate and transmit a request to this Manager 115B. In some embodiments, the request specifies whether the path should be validated prior to use. In one embodiment, the request similarly specifies the relevant network parameters, and/or allowable values for each such parameter. In an embodiment, upon receipt of this request, the Manager 115B facilitates the connectivity. In one embodiment, if no validation is requested, the Manager 115A immediately injects an interface into the Pod 110A, and the Manager 115B can similarly inject an interface into the Pod 110B. The Manager(s) 115A-B can then complete the cross-connect between the created interfaces.

In some embodiments, if validation is requested, the Managers 115A and 115B instead inject interfaces into respective validation agents on each Node 105A and 105B. In one embodiment, the Managers 115A and 115B dynamically create these validation agents upon receiving the request. In another embodiment, the validation agents are already present, and the Managers 115A and 115B inject or configure the required interface(s) to each. The cross-connect can then be created between these validation agents (e.g., between the created or configured interfaces). In an embodiment, the validation agent on the Node 105A can collect and forward telemetry data to the Manager 115A for analysis. The validation agent on the Node 105B can similarly collect and transmit this data to the Manager 115B. The Manager 115B can then forward the information to the Manager 115A.

In the illustrated embodiment, if the path is successfully validated (e.g., if the data satisfies the requirements), the Manager 115A and/or Manager 115B can terminate the connection between the validation agents, and create a connection between the Pods 110A and 110B. In some embodiments, if multiple paths and/or multiple service endpoints were identified, the Manager 115A can similarly validate each such path. In embodiments, the Manager 115A can validate each path sequentially or simultaneously (e.g., in parallel). In one embodiment, after a path is selected, the Manager 115A can retain an indication of the other path(s) for future use. For example, if the selected link degrades, one of the alternative paths can be used. Additionally, if a similar request is subsequently received, the Manager 115A may be able to reuse the gathered data to streamline the selection process.

In some embodiments, if ongoing monitoring is requested, the Manager 115A and 115B can maintain the connectivity between the respective validation agents, and periodically revalidate the connection. In another embodiment, the Manager 115A creates and injects a probe into the Pod 110A, in the form of a validation application. In an embodiment, the system can utilize port-based redirection to route probe packets to the validation application, rather than the client application. In some embodiments, if the remote endpoint supports the probing mechanism, no additional components are required. In an alternative embodiment, the Manager 115B can create and inject a similar validation application into the Pod 110B, as discussed in more detail below.

Figure 2:
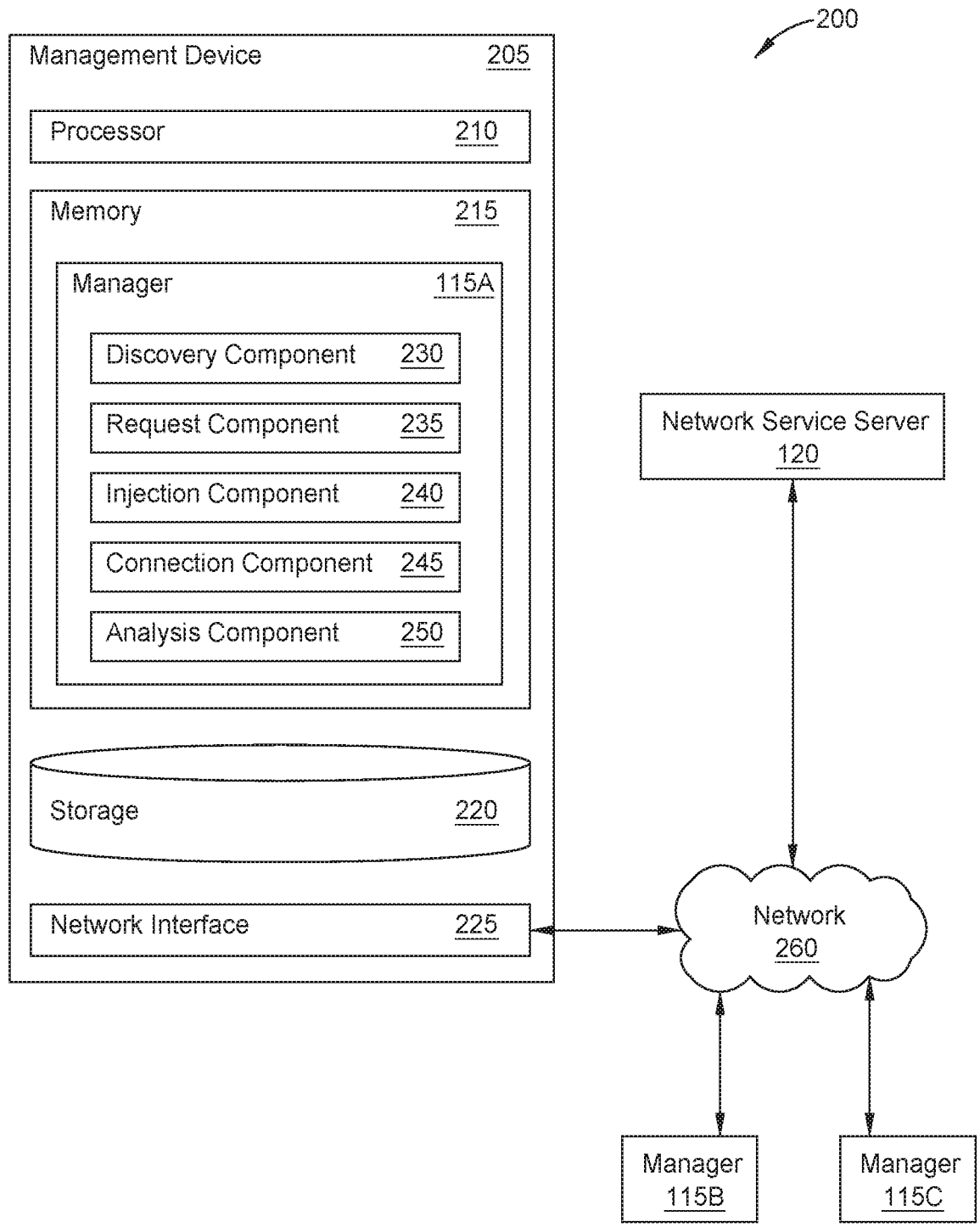
FIG. 2 is a block diagram illustrating a management device capable of validating and monitoring network paths to guarantee performance, according to one embodiment disclosed herein.

FIG. 2 is a block diagram illustrating a Management Device 205 capable of validating and monitoring network paths to guarantee performance, according to one embodiment disclosed herein. In the illustrated embodiment, the Management Device 205 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area network (SAN). Via the Network Interface 225, the Management Device 205 can be communicatively coupled with one or more other devices and components, including the Network Service Server 120, other Managers 115B and 115C, and the like.

Although illustrated as a physical device, in some embodiments, the Management Device 205 may be implemented on a Node 105 using software. In some embodiments, connections to the Network Service Server(s) 120 and the other Manager(s) 115 occur over a broader Network 260, while connectivity to applications residing on the local node are accomplished without the Network 260. In the illustrated embodiment, the Memory 215 includes a Manager 115A. Although illustrated as software residing in Memory 215, in embodiments, the functionality of the Manager 115A can be implemented using hardware, software, or as a combination of hardware and software. As illustrated, the Manager 115A includes a Discovery Component 230, a Request Component 235, an Injection Component 240, a Connection Component 245, and an Analysis Component 250. Although depicted as discrete components for illustration, in embodiments, the operations of the Discovery Component 230, Request Component 235, Injection Component 240, Connection Component 245, and Analysis Component 250 can be combined or divided across any number of components and devices.

In an embodiment, upon receiving a service request from a client application on the node managed by the Manger 115A, the Discovery Component 230 identifies network service endpoints in the mesh that are capable of providing the requested service. In an embodiment, the Discovery Component 230 does so by transmitting a request to (and receiving a response from) the Network Service Server 120. In some embodiments, the Discovery Component 230 can determine whether the service is available locally on the node. If not, the Discovery Component 230 requests a list of potential endpoints and/or paths from the Network Service Server 120. In other embodiments, the Discovery Component 230 always requests this list from the Network Service Server 120.

In one embodiment, the request transmitted by the Discovery Component 230 indicates the type of service desired. In some embodiments, the request further specifies the required network parameters (e.g., the maximum allowable jitter). In embodiments, the response from the Network Service Server 120 specifies a set of network endpoints (and/or network path(s) to endpoints) that are configured to provide the specified service. In one embodiment, if the Discovery Component 230 transmits the required parameters, the Discovery Component 230 can perform an initial pruning of the list, to remove candidates that are unlikely to satisfy the requirements and/or to order the potential paths based on the likelihood they will be satisfactory. This list of options can then be provided to the Request Component 235.

In the illustrated embodiment, the Request Component 235 generates and transmits connectivity requests to other Managers 115, based on the identified set of network service endpoints that can provide the service. In one embodiment, for each indicated network path, the Request Component 235 identifies the corresponding Manager 115 (e.g., the Manager 115 that controls the Node 105 on which the endpoint resides), and transmits a request to the identified Manager 115. In embodiments, these requests can be transmitted sequentially or in parallel. In one embodiment, each request includes a label, a name or indication of the desired network service, a color, an affinity, and the like. In one embodiment, the request also specifies whether the path should be validated prior to use. In some embodiments, the request can further specify relevant operations, administration, and maintenance (OAM) information. For example, the OAM information can include probe information, which timers to use to measure the parameters, metrics to be measured, and the like. In embodiments, upon receipt of the request, the receiving Manager 115 can establish one or more connections, as discussed in more detail below with respect to the Injection Component 240 and the Connection Component 245.

In an embodiment, the Injection Component 240 is used to create and inject interfaces and/or envoys (e.g., validation applications) into the Pods 110 hosted by the Node 105. In one embodiment, when the Request Component 235 transmits the request(s) to remote Manager(s) 115, the local Injection Component 240 also injects one or more corresponding interfaces in local pod(s). In one embodiment, if the client request specified not to validate the connection, the Injection Component 240 creates or configures one or more interface(s) on the Pod 110 hosting the client application, to allow the client application to be cross-connected to the service provider(s). In embodiments of the present disclosure, if the client application requested path validation, the Injection Component 240 instead injects the needed interface(s) to a validation agent that is hosted on the same Node 105 as the client application (but may or may not be located within the same Pod 110).

In some embodiments, if ongoing validation is requested, the Injection Component 240 similarly creates and injects a validation application into the Pod 110 hosting the client application, once a path has been selected. In an embodiment, this validation application periodically generates probe packets to be transmitted to the network service endpoint using the same link that the client application uses (e.g., because it is hosted on the same Pod 110). In an embodiment, the validation application can collect similar metrics as the validation agent collected at path creation, to allow the link to be continuously monitored while in use.

In one embodiment, based on the request transmitted by the Request Component 235, an Injection Component 240 on the remote Manager 115 performs a similar operation to inject or otherwise configure an interface into the validation agent of the remote Node 105. In embodiments, in addition to acting as the originating Manager 115, the Manager 115 may also act as a responding node. That is, in the above-discussed example, the Manager 115A receives a client request from an application hosted on the local Node 105A, and acts to complete the connection. In embodiments, the Manager 115A may also receive a request from a different Manager 115B, and act to establish and complete a connection to a network service endpoint that is hosted on the local Node 105A. In such an embodiment, in response to receiving the request from the remote Node 105, the Injection Component 240 can similarly generate and inject the needed interface(s) to the local validation agent. In some embodiments, when the interface(s) have been successfully implemented, the remote Manager 115 transmits an indication to the originating Manager 115.

In the illustrated embodiment, once the interface(s) are prepared, the Connection Component 245 of the local Node 105 (and the Connection Component 245 of the remote Node 105) completes the cross-connect between the applications, through the data plane of the network mesh. In embodiments, the respective validation agents can then validate the link by exchanging probe packets. In one embodiment, the validation agent(s) themselves confirm that the link satisfies the required parameters. The validation agents can then report this successful validation to their respective Managers 115. In another embodiment, the validation agent(s) transmit the collected data to the Analysis Component 250, which performs the validation. In one embodiment, this includes determining the link's latency, jitter, delay, packet loss, or any other network parameter, and confirming that it satisfies the requirements. In some embodiments, the Analysis Component 250 performs similar analysis for each of the generated links, in order to select a satisfactory one, and/or to select the best link.

In some embodiments, the Analysis Component 250 can store indications of the unselected path(s) for future use. If the selected path becomes unacceptable, in an embodiment, these stored paths can be used to replace the selected link. Additionally, in embodiments utilizing ongoing monitoring, the Analysis Component 250 collects and analyzes data provided by injected validation applications hosted by the Pod 110 containing the client application. Using this data, the Analysis Component 250 can determine whether the connection still meets the requirements. If so, nothing need be done. If the path has degraded, however, the Analysis Component 250 can use one of the previously-identified paths to replace the existing connection. In some embodiments, the Analysis Component 250 can additionally or alternatively trigger a renewed round of validation (e.g., beginning with the Discovery Component 230 identifying paths).

Figure 3C:
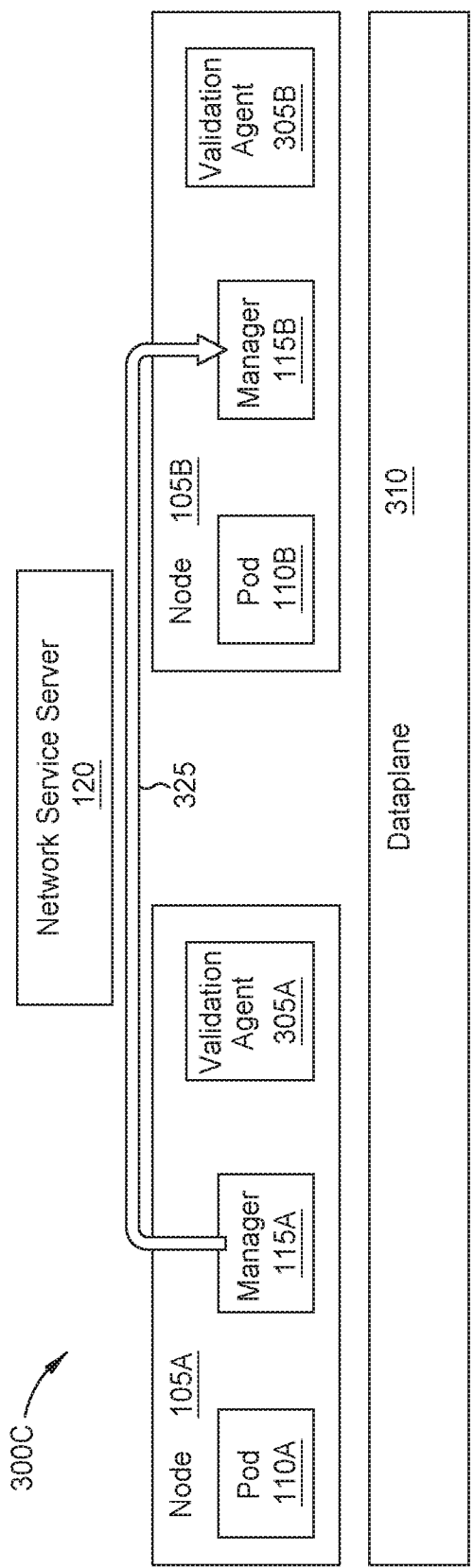

FIGS. 3A through 3H illustrate a workflow for validating and creating connections between network endpoints, according to one embodiment disclosed herein. As illustrated by FIG. 3A, the initial environment 300A includes a Node 105A and Node 105B, each with respective Pods 110A and 110B, Managers 115A and 115B, and Validation Agents 305A and 305B. Although two Nodes 105 are illustrated, in embodiments, there may of course be any number of Nodes 105 in the network mesh. In an embodiment, each Node 105 is a virtual or physical device or collection of devices that hosts applications or service endpoints in pods or containers. In some embodiments, each Node 105 is in a different physical site (e.g., in a data center). Additionally, although a single Pod 110 is illustrated in each Node 105, in embodiments, a given Node 105 may host any number of Pods 110. Further, although illustrated as a Pod 110, in embodiments, the Node 105 may host other containers, network service endpoints, storage units, and the like. In the illustrated embodiment, each Pod 110 is a logical unit or partition that hosts applications, storage, services, and the like.

Further, although a single Manager 115 is illustrated for each Node 105, in some embodiments, there may be multiple Managers 115 for a Node 105, or multiple Nodes 105 may be controlled by a shared Manager 115. In the illustrated embodiment, the environment 300A also includes a Network Service Server 120. In an embodiment, the Network Service Server 120 maintains information relating to the network services available in the mesh, the location(s) where each service is available (e.g., the Node(s) 105 and/or Pod(s) 110 where network service endpoint(s) are located), and the like. In some embodiments, the Network Service Server 120 similarly maintains path information that can be used to connect applications and service endpoints across any of the Nodes 105. In embodiments, there may be any number of Network Service Servers 120 for a given mesh deployment.

In the illustrated embodiment, the environment 300A further includes a Dataplane 310 where the cross-connections between applications, service endpoints, and/or validation agents residing on different Nodes 105 are implemented. In some embodiments, the initial setup messages (e.g., the request(s) and response(s) to and from the Network Service Server 120 and other Managers 115) occur via a control plane of the network. In the illustrated environment 300A of FIG. 3A, a client application residing on the Pod 110A has transmitted a service request to the corresponding local Manager 115A, as depicted by the arrow 315. In an embodiment, this request can specify the desired service, as well as whether validation should be performed prior to creating the connection, and/or during use of the connection.

Turning to FIG. 3B, upon receiving this client request, the Manager 115A identifies one or more network service endpoints that are capable of providing the requested service. In one embodiment, this includes identifying any local endpoints (e.g., hosted on the same Node 105A) that can provide the service. In some embodiments, identifying the available endpoints includes querying the Network Service Server 120. In the illustrated embodiment, as depicted by the arrow 320, the Manager 115A has generated a request to the Network Service Server 120, indicating the needed network service. In response, the Network Service Server 120 has returned a list of the network service endpoints in the mesh that provide the requested service.

In some embodiments, the returned set includes a list of network service endpoints (e.g., the Node 105 and/or Pod 110 where the endpoint is located). In one embodiment, the returned set specifies network paths that can be used to access each endpoint. That is, in some embodiments, the returned information may include multiple paths for a given service endpoint (e.g., located in Pod 110B). Generally, the response can include any number of paths, to any number of network service endpoints, located on any number of Nodes 105.

Continuing to FIG. 3C, upon receiving this data, the Manager 115A identifies one or more Managers 115 responsible for the indicated service endpoints. In one embodiment, the returned information includes this detail. In another embodiment, the Manager 115A can identify the relevant Manager(s) 115 based on the indicated Node(s) 105 on which the network service endpoints reside. As illustrated by arrow 325, the Manager 115A then transmits a request to each identified remote Manager 115. In an embodiment, transmitting this request involves forwarding all or a portion of the information received from the client in the original client request. For example, the request can identify the service, and indicate whether path validation is enabled. Although a single request is illustrated, in embodiments, there may of course be any number of these requests transmitted. For example, in one embodiment, the Manager 115A transmits a separate request for each identified service endpoint, and/or for each identified network pathway.

Figure 3D:
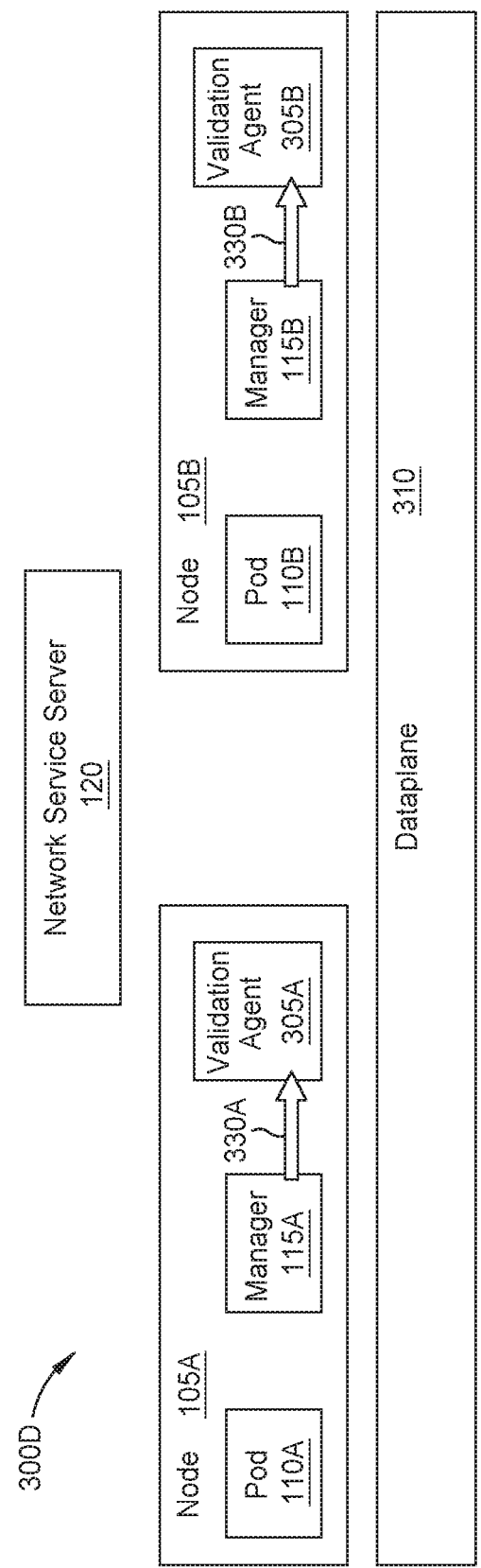

Turning to FIG. 3D, in the illustrated embodiment, in addition to generating and transmitting this request, the Manager 115A generates, injects, and/or configures the needed interface(s) on the local Validation Agent 305A. This process is illustrated by the arrow 330A. In one embodiment, if the client did not request path validation, the Manager 115A can instead directly inject the interface into the Pod 110A containing the client. In an embodiment, injecting the interface includes configuring one or more parameters of the Pod 110A to prepare it to for a connection to the network service endpoint. For example, in one embodiment, injecting the interface includes configuring the Pod 110A with a communication link to the edge of the Node 105A, which can then be connected (e.g., via a tunnel) across the Dataplane 310 to other Nodes 105.

As illustrated by arrow 330B, upon receiving the request from the Manager 115A, the Manager 115B similarly generates, injects, and/or configures one or more interfaces on the respective Validation Agent 305B. In an embodiment, this process is completed separately on each Node 105 contacted by the Manager 115A. That is, each respective Manager 115 that received one or more service requests from the Manager 115A sets up one or more corresponding interfaces on its local Validation Agent 305. In one embodiment, if the set of potential endpoints includes two or more services on a single Node 105, the corresponding Manager 115 can set up a separate interface on the Validation Agent 305 for each such service endpoint. Further, if there are two or more paths to a given service endpoint, the Manager 115 sets up a separate interface for each path. In some embodiments, once the interface(s) are generated and injected, the corresponding Manager 115B transmits an indication to the Manager 115A that the interfaces are configured and the mesh is ready to complete the cross connection.

Continuing to FIG. 3E, once the Validation Agents 305A-B are properly configured, the Manager(s) 115A and/or 115B complete the cross-connect via the Dataplane 310. In an embodiment, this connection 335 enables L2/L3 traffic between the Validation Agents 305A and 305B. In embodiments of the present disclosure, the Validation Agents 305A-B can then exchange probe packets to test quality of the cross-connect between the Nodes 105A and 105B. In embodiments, this can include measuring the latency or delay between the Nodes 105A-B, the jitter on the connection, the rate of packet loss, and the like.

Turning to FIG. 3F, once the Validation Agents 305A-B have exchanged a sufficient number of packets to quantify the connection quality, one or both of the Validation Agents 305A-B can report these statistics to their respective Managers 115A-B. In the illustrated embodiment, this is depicted by arrows 340A and 340B. In one embodiment, the Validation Agents 305A-B determine whether the statistics satisfy the defined thresholds or requirements, and transmit an approval or rejection for the path. In another embodiment, the Validation Agents 305A-B forward the statistics themselves to their Managers 115A-B, and the Managers 115A-B validate the parameters. In the illustrated embodiment, the Validation Agent 305B sends the parameters to the Manager 115B, which forwards them on to the Manager 115A.

In some embodiments, however, only the Validation Agent 305A on the originating Node 105A performs this validation, and the Validation Agent 305B simply responds to the probes it receives. In such an embodiment, the Manager 115A validates or rejects the path using data collected only from the local Validation Agent 305A. As discussed above, in embodiments, this process is repeated for each path that is currently being tested by the Manager 115A. In an embodiment, the Manager 115A then selects a path to satisfy the client request. In one embodiment, this includes selecting the best path that best satisfies the client request (e.g., with the least latency, the least jitter, the least packet loss, and the like). In some embodiments, the Manager 115A selects any path that satisfies the client requirements. If multiple paths are sufficient, the Manager 115A may select among them using any technique (e.g., to ensure load balancing).

As depicted in FIG. 3G, once a path has been selected, the Manager 115A generates and injects an appropriate interface into the local Pod 110A to service the requesting client application. This is depicted by arrow 345A. Although not depicted in the environment 300G, in embodiments, the Manager 115A further transmits an indication or instruction to the remote Manager 115B to accept or finalize the connection. That is, the Manager 115A identifies the Manager 115B that manages the selected service endpoint, and transmits a request to establish a connection from the requesting Pod 110A to the selected service. As illustrated by arrow 345B, the Manager 115B does so by generating and injecting one or more interfaces into the Pod 110B that contains the selected network service endpoint. In some embodiments, the Manager 115 further instructs the remote Managers 115 to terminate the generated connections between validation agents corresponding to unselected nodes or paths.

Finally, turning to FIG. 3H, once these interfaces are established, the Manager 115A and/or 115B complete the cross-connection between the Nodes 105A and 105B. This is depicted using arrow 350. In this way, the client application can communicate freely with the selected network service endpoint, using a connection that has been tested and validated by the Manager 115A. In some embodiments, in addition to establishing this connection, the Manager 115A also removes the connection and/or interface from the Validation Agent 305A, and instructs the Manager 115G to perform the same with respect to its Validation Agent 305B.

Figure 4:
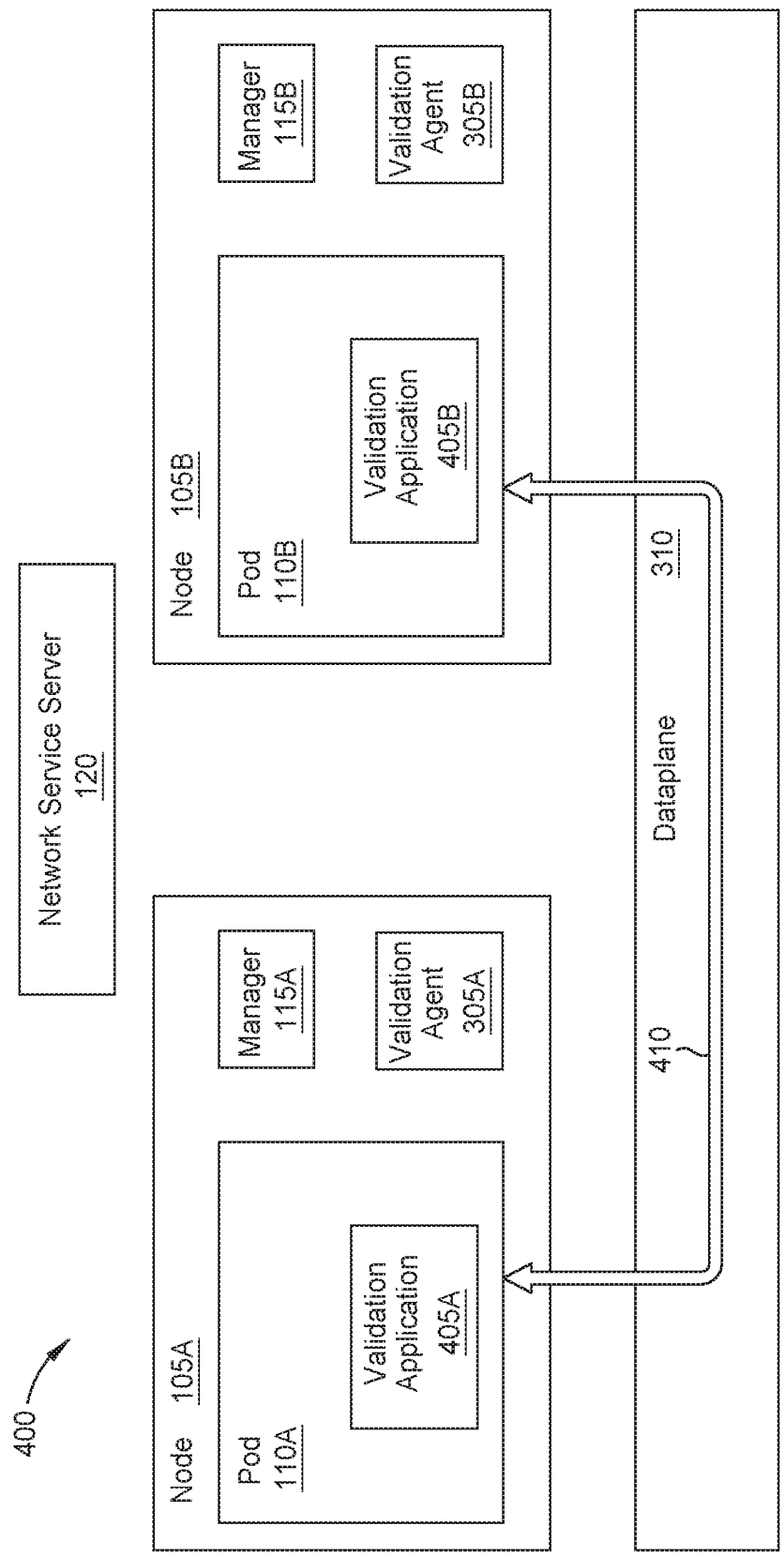
FIG. 4 illustrates a technique for continuous monitoring of network performance, according to one embodiment disclosed herein.

FIG. 4 illustrates a technique for continuous monitoring of network performance, according to one embodiment disclosed herein. As illustrated, the environment 400 includes the Nodes 105A and 105B, as discussed above. In the illustrated embodiment, the Pods 110A and/or 110B are configured as multi-pod containers (also referred to as multi-container pods) that can host more than one client application. That is, in the illustrated embodiment, each Pod 110A and 110B can host one or more containers, applications, or logical units within the same volume. In one embodiment, these components within a single Pod 110 can share resources of the Pod 110 (such as the ports and/or interfaces used to communicate with other components).

In the illustrated embodiment, if the client application has requested continuous or ongoing monitoring of the connection, the Manager 115A injects a Validation Application 405A into the Pod 110A, to exist alongside the client application (not pictured). In one embodiment, the Manager 115A configures the Pod 110A to route packets correctly using port-forwarding. For example, the Manager 115A may configure the Pod 110A to forward packets received on a first port to the Validation Application 405A, and packets received on a second port to the client application. In an embodiment, if the remote endpoint supports probing mechanisms (such as a seamless-bidirectional forwarding or SBFD discriminator), there is no need to inject a similar Validation Application 405 on the endpoint Node 105B. Otherwise, a similar container can be injected into the Pod 110B.

In an embodiment, the Validation Application 405A can periodically transmit probe packets in a similar fashion to the Validation Agent 305A. In one embodiment, the Validation Application 405A reports its periodic tests to the Manager 115A. In some embodiments, the Validation Application 405A only contacts the Manager 115A if the connection quality has fallen below the defined requirements. In embodiments, if the connection is no longer satisfactory, the Manager 115A can take a number of steps to ensure client expectations are met. In one embodiment, if the Manager 115A maintained the list of pathways, the Manager 115A can select one of these alternative paths to use. In some embodiments, when the initial connection was established, the Manager 115A stored information relating to the unselected paths, including the parameters or statistics associated with each. In such an embodiment, the Manager 115A can select the next-best path to replace the existing connection.

In some embodiments, replacing the existing connection includes similar steps to those used to establish the initial connection. In one embodiment, the Manager 115A can re-validate all of the stored paths, or can request an updated list from the Network Service Server 120. In one embodiment, this re-validation is completed if a predefined period of time has elapsed since the paths were last evaluated. In some embodiments, the Manager 115A only re-validates the next-best path. In this way, the Manager 115A can ensure that the client application continues to receive service meeting or exceeding the requirements of the request.

Figure 5:
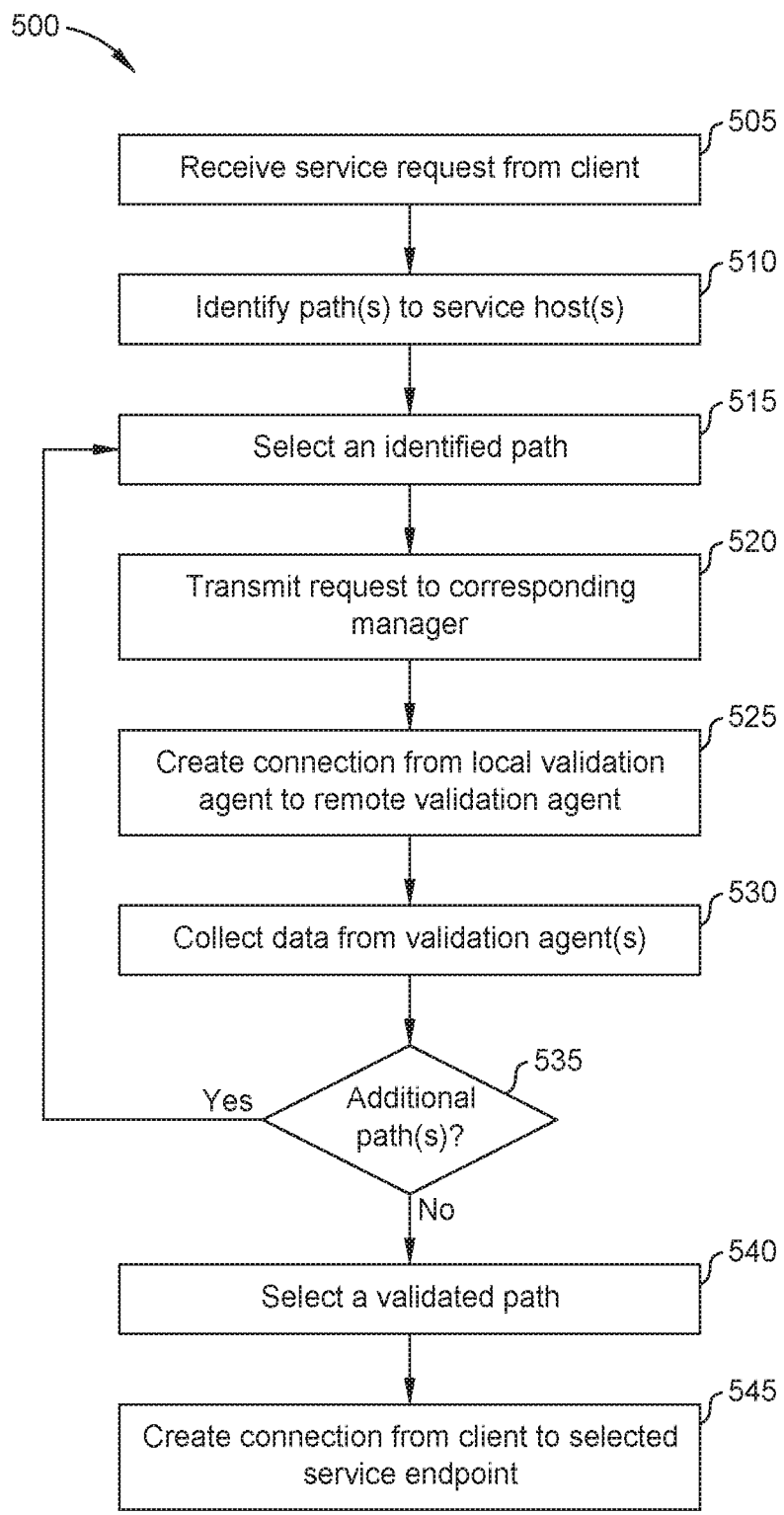
FIG. 5 is a flow chart illustrating a method for path validation and service assurance, according to one embodiment disclosed herein.

FIG. 5 is a flow chart illustrating a method 500 for path validation and service assurance, according to one embodiment disclosed herein. The method 500 begins at block 505, where a Manager 115 receives, from a client application, a service request. In an embodiment, the client is an application hosted or otherwise operating on the Node 105 that the Manager 115 manages. In embodiments, the request can include an indication as to the service(s) desired (e.g., storage, firewall services, and the like). In one embodiment, the request further specifies whether the path should be validated prior to use, continuously while in use, neither, or both. The request may also specify the allowable values for each parameter. In another embodiment, the Manager 115 retrieves and analyzes a profile associated with the client application, in order to determine whether validation is required, and/or the minimum allowable statistics.

The method 500 then proceeds to block 510 where the Manager 115 identifies a set of one or more paths to service host(s) that can provide the requested service. In one embodiment, this includes identifying service endpoints that are local to the client application (e.g., executing on the same Node 105). In some embodiments, the Manager 115 identifies potential paths by sending a request to a Network Service Server 120 that maintains data regarding the services available in the network mesh. In an embodiment, the identified paths include one or more pathways through the mesh that connect the Pod 110 containing the client application to a network service endpoint located locally or on a remote node. The method 500 then continues to block 515.

At block 515, the Manager 115 selects one of the identified paths to be validated. At block 520, the Manager 115 identifies the manager responsible for the network service endpoint corresponding to the selected path. The Manager 115 then transmits a request to this identified remote manager. In one embodiment, in addition to identifying the desired service endpoint, the request also specifies whether the path should be validated first. In some embodiments, this request further indicates the parameters that are to be monitored. As discussed above, in an embodiment, the remote manager responds to this request by injecting an interface to its respective validation agent.

The method 500 then proceeds to block 525, where the Manager 115 creates a connection from its local validation agent to the remote validation agent. That is, the Manager 115 injects the needed interface(s) to its local validation agent, and completes the cross-connect on the dataplane between the nodes. At block 530, the Manager 115 collects data from one or both validation agents. In embodiments, this data can include values for one or more network parameters being monitored, and/or an indication as to whether the connection satisfies the requirements. In some embodiments, the Manager 115 collects this data for a predefined period of time prior to concluding whether the connection is validated or not. The method 500 then continues to block 535.

At block 535, the Manager 115 determines whether there are any additional paths remaining to be validated. If so, the method 500 returns to block 515. Otherwise, the method 500 continues to block 540, where the Manager 115 selects one of the validated paths. In one embodiment, the Manager 115 selects the path with the highest quality connection (e.g., with the lowest latency). In another embodiment, the Manager 115 selects among the validated paths based on other parameters (e.g., to ensure load-balancing). In some embodiments, if no paths satisfy the requirements, the Manager 115 declines to initiate any connections for the client application, and returns an indication that there is no such service available. In other embodiments, the Manager 115 selects the best available path, even if it is not sufficiently high-quality.

Finally, at block 545, the Manager 115 creates a connection between the client application and the selected service endpoint using the selected path. In an embodiment, as discussed above, this includes generating and injecting one or more interfaces into the Pod 110 containing the client application. In some embodiments, the Manager 115 further instructs the remote manager to similarly inject an interface into the network service endpoint. In one embodiment, the Manager 115 additionally removes the connection between the validation agents, and/or removes or reconfigures the interfaces of its local validation agent. The method 500 then terminates.

Figure 6:
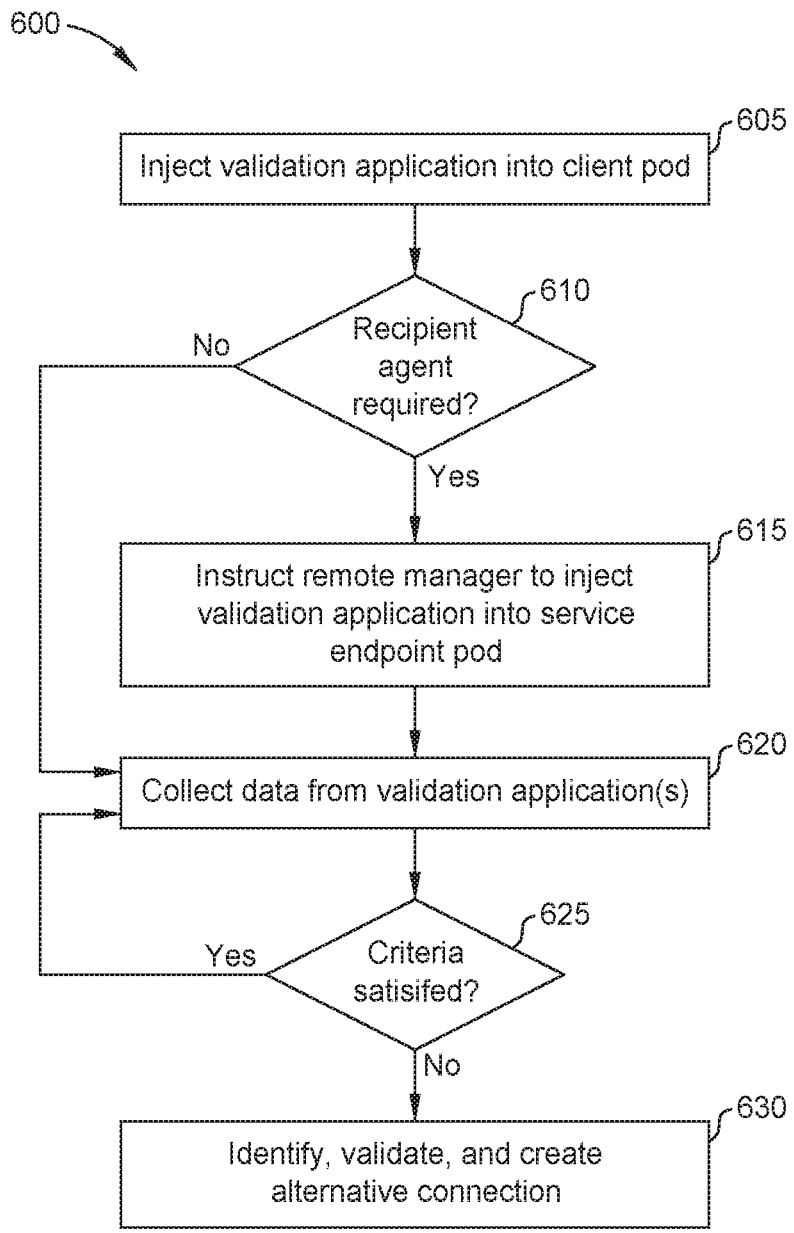
FIG. 6 is a flow chart illustrating a method for continuous path validation and monitoring, according to one embodiment disclosed herein.

FIG. 6 is a flow chart illustrating a method 600 for continuous path validation and monitoring, according to one embodiment disclosed herein. The method 600 begins at block 605, where the Manager 115 injects a Validation Application 405 into the Pod 110 that is hosting the client application. At block 610, the Manager 115 determines whether a similar agent is required on the network service endpoint. If not, the method 600 proceeds to block 620. If such an application is required, the method 600 continues to block 615, where the Manager 115 instructs the remote manager to inject such an application on the remote pod. In embodiments, the injected Validation Application(s) 405 can utilize the same connection already existing between the Pod 110 of the client application and the network service endpoint.

At block 620, the Manager 115 collects data from one or both Validation Applications 405. In one embodiment, this data is similar to the data collected by the Validation Agents 305, and includes telemetry regarding the quality of the connection between the pods. At block 625, after a predefined period of time, the Manager 115 determines whether the connection criteria remain satisfied. That is, the Manager 115 determines whether the delay, jitter, packet loss, and the like are still within satisfactory levels. If so, the path remains validated, and the method 600 returns to block 620. If the path is no longer valid, the method 600 proceeds to block 630, where the Manager 115 identifies, validates, and injects or creates an alternative path for the client application, as discussed above.

Figure 7:
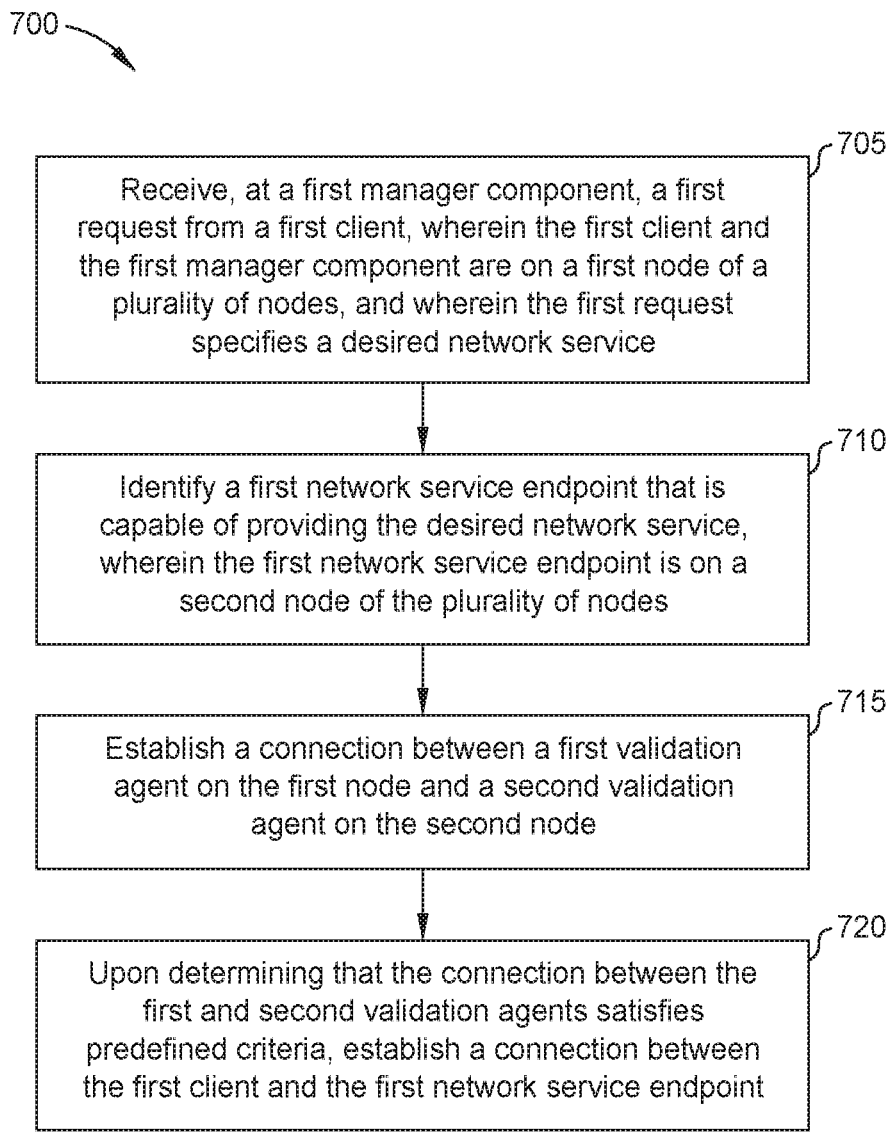
FIG. 7 is a flow diagram illustrating a method for performance assurance, according to one embodiment disclosed herein.

FIG. 7 is a flow diagram illustrating a method 700 for performance assurance, according to one embodiment disclosed herein. The method 700 begins at block 705, where a first Manager 115 receives a first request from a first client, wherein the first client and the first Manager 115 are on a first node of a plurality of nodes, and wherein the first request specifies a desired network service. At block 710, the first Manager 115 identifies a first network service endpoint that is capable of providing the desired network service, wherein the first network service endpoint is on a second node of the plurality of nodes. The method 700 then continues to block 715, where the first Manager 115 establishes a connection between a first validation agent on the first node and a second validation agent on the second node. Finally, upon determining that the connection between the first and second validation agents satisfies predefined criteria, the first Manager 115 establishes a connection between the first client and the first network service endpoint.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving, at a first manager component, a first request from a first client, wherein the first client and the first manager component are on a first node of a plurality of nodes, and wherein the first request specifies a desired network service;
   identifying a first network service endpoint that is capable of providing the desired network service, wherein the first network service endpoint is on a second node of the plurality of nodes;
   establishing a first connection between a first validation agent on the first node and a second validation agent on the second node, wherein the first validation agent transmits one or more probe packets to the second validation agent via the first connection; and
   upon determining, based on the one or more probe packets, that the first connection between the first and second validation agents satisfies predefined criteria, establishing a second connection between the first client and the first network service endpoint.

2. The method of claim 1, wherein establishing the first connection between the first validation agent and the second validation agent comprises:
   transmitting, to a second manager component on the second node, a second request to establish the second connection between the first client and the first network service endpoint, wherein the second request indicates that the second connection should be validated before use.

3. The method of claim 2, wherein, upon receiving the second request, the second manager component creates and injects an interface to the second validation agent, and wherein the second request further specifies a set of parameters to gather about the first connection between the first and second validation agents.

4. The method of claim 2, wherein establishing the second connection between the first client and the first network service endpoint comprises:
   creating and injecting a first interface to the first client; and
   instructing the second manager component to create and inject a second interface to the first network service endpoint.

5. The method of claim 1, the method further comprising:
   injecting, into a pod containing the first client, a validation application, wherein the validation application transmits probe packets to the first network service endpoint via the second connection between the first client and the first network service endpoint; and
   upon determining, based on the probe packets, that the second connection between the first client and the first network service endpoint does not satisfy the predefined criteria, establishing a third connection between the first client and a second network service endpoint.

6. The method of claim 1, the method further comprising:
   determining that there is a plurality of paths between the first node and the second node;
   establishing a plurality of connections between the first validation agent and the second validation agent, wherein each of the plurality of connections corresponds to a path in the plurality of paths;
   selecting a first path of the plurality of connections to use for the second connection between the first client and the first network service endpoint; and
   reserving the plurality of paths as alternatives for the first path.

7. The method of claim 6, the method further comprising:
   upon determining that the second connection between the first client and the first network service endpoint no longer satisfies the predefined criteria, selecting a second path of the plurality of paths to be used for the second connection between the first client and the first network service endpoint.

8. The method of claim 1, the method further comprising:
   identifying a second network service endpoint that can provide the desired network service, wherein the second network service endpoint is on a third node of the plurality of nodes;
   establishing a third connection between the first validation agent and a third validation agent on the third node; and
   upon determining that the third connection between the first and third validation agents does not satisfy the predefined criteria, refraining from establishing a fourth connection between the first client and the second network service endpoint.

9. The method of claim 1, wherein identifying the first network service endpoint comprises:
   transmitting a second request specifying the desired network service to a network service server; and
   receiving a list of network service endpoints that are capable of providing the desired network service.

10. A non-transitory computer-readable storage medium having computer-readable program code embodied therewith, the computer-readable program code executable by one or more computer processors to perform an operation comprising:
    receiving, at a first manager component, a first request from a first client, wherein the first client and the first manager component are on a first node of a plurality of nodes, and wherein the first request specifies a desired network service;
    identifying a first network service endpoint that is capable of providing the desired network service, wherein the first network service endpoint is on a second node of the plurality of nodes;
    establishing a first connection between a first validation agent on the first node and a second validation agent on the second node, wherein the first validation agent transmits one or more probe packets to the second validation agent via the first connection; and
    upon determining, based on the one or more probe packets, that the first connection between the first and second validation agents satisfies predefined criteria, establishing a second connection between the first client and the first network service endpoint.

11. The non-transitory computer-readable storage medium of claim 10, wherein establishing the first connection between the first validation agent and the second validation agent comprises:
    transmitting, to a second manager component on the second node, a second request to establish the second connection between the first client and the first network service endpoint, wherein the second request indicates that the second connection should be validated before use.

12. The non-transitory computer-readable storage medium of claim 11, wherein establishing the second connection between the first client and the first network service endpoint comprises:
    creating and injecting a first interface to the first client; and
    instructing the second manager component to create and inject a second interface to the first network service endpoint.

13. The non-transitory computer-readable storage medium of claim 10, the operation further comprising:
    injecting, into a pod containing the first client, a validation application, wherein the validation application transmits probe packets to the first network service endpoint via the second connection between the first client and the first network service endpoint; and
    upon determining, based on the probe packets, that the second connection between the first client and the first network service endpoint does not satisfy the predefined criteria, establishing a third connection between the first client and a second network service endpoint.

14. The non-transitory computer-readable storage medium of claim 10, the operation further comprising:
    determining that there is a plurality of paths between the first node and the second node;
    establishing a plurality of connections between the first validation agent and the second validation agent, wherein each of the plurality of connections corresponds to a path in the plurality of paths;
    selecting a first path of the plurality of connections to use for the second connection between the first client and the first network service endpoint; and
    reserving the plurality of paths as alternatives for the first path.

15. The non-transitory computer-readable storage medium of claim 10, the operation further comprising:
    identifying a second network service endpoint that can provide the desired network service, wherein the second network service endpoint is on a third node of the plurality of nodes;
    establishing a third connection between the first validation agent and a third validation agent on the third node; and
    upon determining that the third connection between the first and third validation agents does not satisfy the predefined criteria, refraining from establishing a fourth connection between the first client and the second network service endpoint.

16. A system comprising:
    one or more computer processors; and
    a memory containing a program which when executed by the one or more computer processors performs an operation, the operation comprising:
        receiving, at a first manager component, a first request from a first client, wherein the first client and the first manager component are on a first node of a plurality of nodes, and wherein the first request specifies a desired network service;
        identifying a first network service endpoint that is capable of providing the desired network service, wherein the first network service endpoint is on a second node of the plurality of nodes;
        establishing a first connection between a first validation agent on the first node and a second validation agent on the second node, wherein the first validation agent transmits one or more probe packets to the second validation agent via the first connection; and
        upon determining, based on the one or more probe packets, that the first connection between the first and second validation agents satisfies predefined criteria, establishing a second connection between the first client and the first network service endpoint.

17. The system of claim 16, wherein establishing the first connection between the first validation agent and the second validation agent comprises:
    transmitting, to a second manager component on the second node, a second request to establish the second connection between the first client and the first network service endpoint, wherein the second request indicates that the second connection should be validated before use.

18. The system of claim 17, wherein establishing the second connection between the first client and the first network service endpoint comprises:
    creating and injecting a first interface to the first client; and
    instructing the second manager component to create and inject a second interface to the first network service endpoint.

19. The system of claim 16, the operation further comprising:
    injecting, into a pod containing the first client, a validation application, wherein the validation application transmits probe packets to the first network service endpoint via the second connection between the first client and the first network service endpoint; and
    upon determining, based on the probe packets, that the second connection between the first client and the first network service endpoint does not satisfy the predefined criteria, establishing a third connection between the first client and a second network service endpoint.

20. The system of claim 16, the operation further comprising:
    determining that there is a plurality of paths between the first node and the second node;
    establishing a plurality of connections between the first validation agent and the second validation agent, wherein each of the plurality of connections corresponds to a path in the plurality of paths;
    selecting a first path of the plurality of connections to use for the second connection between the first client and the first network service endpoint; and
    reserving the plurality of paths as alternatives for the first path.

* * * * *

UNITED STATES PATENT AND TRADEMARK OFFICE
CERTIFICATE OF CORRECTION

PATENT NO. : 11,228,651 B2  
APPLICATION NO. : 16/559526  
DATED : January 18, 2022  
INVENTOR(S) : Edward A. Warnicke et al.

Page 1 of 1

It is certified that error appears in the above-identified patent and that said Letters Patent is hereby corrected as shown below:

In the Specification

Column 3, Line 56, delete "1108" and insert -- 110B --.

Column 4, Line 38, delete "1158" and insert -- 115B --.

Column 4, Line 44, delete "1058" and insert -- 105B --.

Column 7, Line 10, delete "1158," and insert -- 115B, --.

Column 7, Line 60, delete "1108," and insert -- 110B, --.

Column 10, Line 48, delete "1156" and insert -- 115B --.

Signed and Sealed this
Eighth Day of March, 2022

Drew Hirshfeld
*Performing the Functions and Duties of the
Under Secretary of Commerce for Intellectual Property and
Director of the United States Patent and Trademark Office*